(12) United States Patent
Meldahl et al.

(10) Patent No.: US 7,933,003 B2
(45) Date of Patent: Apr. 26, 2011

(54) METHOD AND APPARATUS FOR STUDYING SURFACE VIBRATIONS BY MOVING SPECKLE INTERFEROMETER

(75) Inventors: Paul Meldahl, Forus (NO); Eiolf Vikhagen, Trondheim (NO)

(73) Assignee: Statoil ASA, Stavanger (NO)

( * ) Notice: Subject to any disclaimer, the term of this patent is extended or adjusted under 35 U.S.C. 154(b) by 632 days.

(21) Appl. No.: 11/659,383

(22) PCT Filed: Aug. 3, 2005

(86) PCT No.: PCT/GB2005/003038
§ 371 (c)(1),
(2), (4) Date: May 29, 2007

(87) PCT Pub. No.: WO2006/013358
PCT Pub. Date: Feb. 9, 2006

(65) Prior Publication Data
US 2008/0316496 A1      Dec. 25, 2008

(30) Foreign Application Priority Data

Aug. 4, 2004 (GB) .................................. 0417370.4

(51) Int. Cl.
G01P 3/36 (2006.01)
G01B 11/02 (2006.01)

(52) U.S. Cl. ...................................................... 356/28.5

(58) Field of Classification Search ................. 356/28.5, 356/482, 486, 493, 498, 502, 508
See application file for complete search history.

(56) References Cited

U.S. PATENT DOCUMENTS 3,711,200 A * 1/1973 Maughmer ..................... 356/28

(Continued)

FOREIGN PATENT DOCUMENTS

DE      34 30 820 A1    3/1986

(Continued)

OTHER PUBLICATIONS

Agneni et al., "Image Processing for Fringe Unwrapping in Speckle Interferometry," Proceedings of the SPIE, SPIE, Bellingham, VA, USA, 4062:1479-1484 (2000).

(Continued)

*Primary Examiner* — Gregory J Toatley
*Assistant Examiner* — Scott M Richey
(74) *Attorney, Agent, or Firm* — Patterson Thuente Christensen Pedersen, P.A.

(57) ABSTRACT

A method of studying a surface using an interferometer, in which there is relative motion between the surface and the interferometer, the motion having a total velocity $V_{tot}$ which includes a transversal or traversing component $V_t$ and a longitudinal component $V_l$. The method comprises: directing an object beam of coherent light to a measurement position at the surface, whereby there is relative motion between the surface and the measurement position; arranging an array of detectors on the interferometer in a line extending generally in the transversal direction, the detectors being arranged to detect light rays with different angular directions, representing different sensitivity directions; producing a reference beam of coherent light which is coherent with the abject beam; combining the reference beam with the reflected object beam from the surface to produce a cross interference in the speckle pattern providing information about the relative motion of the surface and the interferometer; detecting the speckle pattern and the cross interference pattern with the detectors; determining which detector in the array has zero or minimum sensitivity to the total velocity $V_{tot}$ of the motion, thereby identifying the detector with a sensitivity direction line that is normal to $V_{tot}$; monitoring the temporal change in which of the detectors has zero or minimum sensitivity, thereby ascertaining the change in direction of $V_{tot}$ over time, brought about by changes in $V_l$: and determining temporal changes in $V_t$.

17 Claims, 8 Drawing Sheets

U.S. PATENT DOCUMENTS

| | | | |
|---|---|---|---|
| 3,804,521 A | | 4/1974 | Sprague |
| 4,311,383 A | * | 1/1982 | Ohtsubo ............... 356/28.5 |
| 4,470,696 A | * | 9/1984 | Ballard ............... 356/28.5 |
| 5,018,862 A | * | 5/1991 | Aiello ............... 356/450 |
| 5,493,398 A | * | 2/1996 | Pfister ............... 356/512 |
| 5,587,785 A | * | 12/1996 | Kato et al. ............... 356/28.5 |
| 5,623,307 A | | 4/1997 | Kotidis et al. |
| 5,783,752 A | * | 7/1998 | Thorburn et al. ............... 73/800 |
| 6,081,481 A | | 6/2000 | Sabatier et al. |
| 6,115,127 A | | 9/2000 | Brodeur et al. |
| 6,277,075 B1 | * | 8/2001 | Torp et al. ............... 600/443 |
| 6,642,506 B1 | * | 11/2003 | Nahum et al. ............... 250/231.13 |
| 7,116,427 B2 | * | 10/2006 | Baney et al. ............... 356/498 |
| 7,242,481 B2 | * | 7/2007 | Shpantzer et al. ............... 356/502 |
| 7,317,538 B2 | * | 1/2008 | Wada et al. ............... 356/486 |
| 7,423,279 B2 | * | 9/2008 | Heinz et al. ............... 250/559.32 |
| 7,583,387 B2 | * | 9/2009 | Meldahl et al. ............... 356/498 |
| 7,619,744 B2 | * | 11/2009 | Liess ............... 356/498 |
| 7,708,695 B2 | * | 5/2010 | Akkermans et al. ............... 600/504 |
| 2009/0025480 A1 | * | 1/2009 | Aharoni ............... 73/655 |

FOREIGN PATENT DOCUMENTS

| | | |
|---|---|---|
| EP | 1 001 249 A1 | 5/2000 |
| GB | 673971 | 6/1952 |
| GB | 2 411 011 A | 8/2005 |
| JP | 2006-118989 | 5/2006 |
| WO | WO 2004/003589 | 1/2004 |
| WO | WO 2005/078479 | 8/2005 |
| WO | WO 2006/013358 A1 | 2/2006 |
| WO | WO 2007/020396 A1 | 2/2007 |

OTHER PUBLICATIONS

Application and File History for U.S. Appl. No. 12/920,273, filed Aug. 30, 2010, Inventor Meldahl et al., www.uspto.gov.

International Search Report for PCT/GB2009/000523 dated May 7, 2009 and Great Britain Search Report for GB0903235.0 dated Apr. 23, 2009.

* cited by examiner

METHOD AND APPARATUS FOR STUDYING SURFACE VIBRATIONS BY MOVING SPECKLE INTERFEROMETER

RELATED APPLICATIONS

This application claims priority to PCT Application No. PCT/GB2005/003038 filed Aug. 3, 2005, and Great Britain Application No. 0417370.4 filed Aug. 4, 2004, the disclosures of which are hereby incorporated by reference in their entireties.

TECHNICAL FIELD

The present invention is concerned with studying an object, in particular, studying displacement at, on or in a surface. The invention is applicable to any surface, such as a machine part, a product such as a metal sheet (to detect flaws), or a surface which is subject to vibration such as a window pane. The invention is also particularly applicable to the movement of the earth's surface, such as the sea floor, for seismic exploration.

BACKGROUND OF THE INVENTION

The invention makes use of coherent light, such as lasers and an interferometer, to study the displacements temporally or over time. Such techniques have been contemplated in the present applicants' co-pending UK Patent Application No. 0402914.6 and WO 04/003589, both of which are concerned with seismic exploration. The present invention is more generally applicable.

In the earlier cases, the techniques involved tracing fast interferometric signals closely, to calculate accurately the displacements of the object. High sampling frequencies were required, and the displacements were found after integration of a large number of separate sequential recordings. In the present application, the system is not tracing the fast interferometric signals, but actually tracing the slow signals in the system.

This simplifies the design of the system considerably, and requires less-expensive components.

SUMMARY OF THE INVENTION

According to the invention, there is provided a method of studying a surface using an interferometer, in which there is relative motion between the surface and the interferometer, the motion having a total velocity $V_{tot}$ which includes a transversal or traversing component $V_t$ and a longitudinal component $V_l$, the method comprising: directing an object beam of coherent light to a measuring position at the surface, whereby there is relative motion between the surface and the measurement position; arranging an array of detectors on the interferometer in a line extending generally in the transversal direction, the detectors being arranged to detect light rays with different angular directions, representing different sensitivity directions; producing a reference beam of coherent light which is at least partly coherent with the object beam; combining the reference beam with the reflected object beam from the surface to produce a cross interference in the speckle pattern providing information about the relative motion of the surface and the interferometer; detecting the speckle pattern and the cross interference pattern with the detectors; determining which detector in the array has zero or minimum sensitivity to the total velocity $V_{tot}$ of the motion, thereby identifying the detector with a sensitivity direction line that is normal to $V_{tot}$; monitoring the temporal change in which of the detectors has zero or minimum sensitivity, thereby ascertaining the change in direction of $V_{tot}$ over time, brought about by changes in $V_l$; and determining temporal changes in $V_l$.

Preferably, the object beam and reference beam emanate from the interferometer. The interferometer may be moving constantly in the transversal direction and the surface may be moving intermittently, relatively, in a direction which may be other than the transversal direction.

The invention also extends to apparatus for carrying out the method of the invention and a report produced by carrying out the method of the invention.

BRIEF DESCRIPTION OF THE DRAWINGS

The invention may be carried into practice in various ways and some embodiments will now be described by way of example with reference to the accompanying drawings, in which.

DETAILED DESCRIPTION OF THE DRAWINGS

Figure 1:
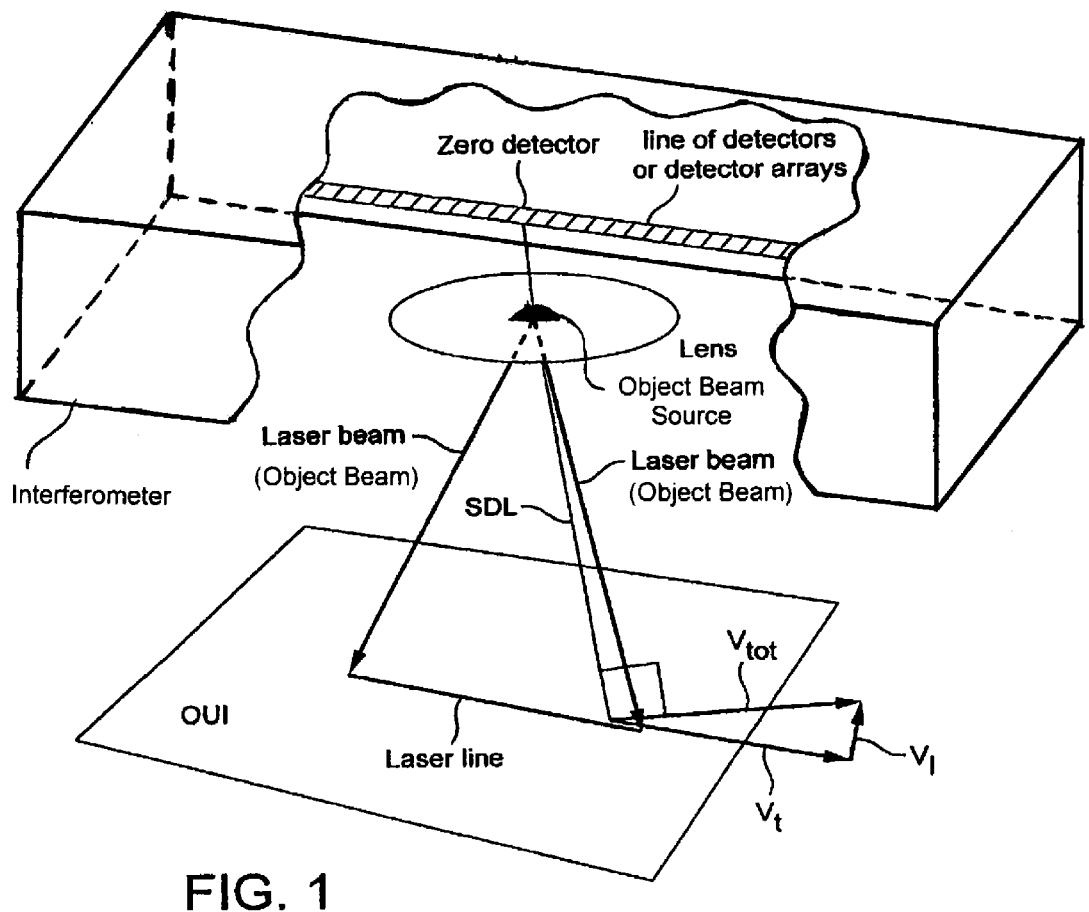
FIG. 1 is a schematic view showing the general principles of the invention.

Referring to FIG. 1, a laser beam is expanded to illuminate the object under investigation (OUI) along a line as shown in FIG. 1. The OUI can be the sea floor or other objects, like the surface of a rotating machine part.

There is relative movement between the measurement position which may be a point, but here is a line on the surface of the OUI and the interferometer (optical head). The relative movement has a transversal velocity component $V_t$ as shown in FIG. 1, and also a longitudinal velocity component $V_l$. In a real measurement situation, it can be the OUI which is moving or it can be the interferometer which is moving, or both. For simplicity, this movement is described as if it is the OUI which is moving only. It is assumed that the velocity components are the same or approximately the same for all points along the laser line on the object. The laser line will normally have a limited length (from millimetre to meter) or in special applications it can be continuous over large distances.

Primarily, the invention is used to detect temporal variations of the longitudinal velocity component $V_l$ of AC light levels. Depending on the direction of the laser beams and the directions of the OUI oscillations (wave), the $V_l$ can have component both out of the plane and into the OUI surface.

The OUI can be a flat or a curved surface. "AC light" refers to light which varies substantially in intensity over a typical window of time.

A line of detector elements is arranged basically in the same direction as the transversal velocity component $V_t$, as shown in FIG. 1. Each detector element can also be replaced with a detector array or transversal detector line, which allows averaging over several detector elements for each position on the detector line in FIG. 1. Alternatively, a whole full-field detector array can be used. The detector elements or detector arrays are also illuminated by one or more reference beams, which are at least partly coherent with the object light reflected from the OUI (the reference beams are not shown in FIG. 1). In front of the line of detectors, there is an imaging lens or lens system or other imaging optics like e.g. curved mirrors. The imaging optics images the laser line on the OUI onto the line of detectors.

Instead of a laser line on the object surface, there can be a scanning laser point which is scanned along a similar line on the object. A whole field on the object surface can also be illuminated, preferably if a full field detector array is used so that the illuminated part of the object is imaged onto the detector array.

The laser beam which is illuminating the OUI can also be converging or diverging with focus at different distances from the source, including points below or beyond the OUI. But preferably, the laser source for the object illumination is located in, or close to, the aperture of the lens in FIG. 1. This means that illumination and observation directions are parallel. The laser beams can be pointing in different angular directions towards the OUI.

Changes in the longitudinal velocity component $V_l$ mean that the direction of the total velocity $V_{tot}$ will change. With this invention, we detect temporal changes in the direction of $V_{tot}$, and hence, temporal changes in the longitudinal velocity component $V_l$.

Each detector element in the interferometer, located at a specific location along the line of detectors or in the detector array, has its own specific sensitivity direction. The line SDL in FIG. 1 represents a line or direction like this. The interferometer and the laser beam is located and arranged with angular directions so that at least one detector or a group of detectors has a sensitivity direction line SDL which is normal to the velocity $V_{tot}$. If a full field detector array is used together with a full field object illumination, there will be a line of detectors across the array which all have a sensitivity direction normal to the velocity $V_{tot}$.

A detector element with a sensitivity line SDL which is normal to the velocity $V_{tot}$ will have no sensitivity to the velocity $V_{tot}$. All other detector elements with other sensitivity directions will pick up a smaller or larger part of the velocity $V_{tot}$.

Each detector element in the interferometer detects the interference between the object light and the reference light, and the intensity on a detector element is given by the equation:

$$I=I_{ref}+I_{obj}+2\cdot\mu\cdot\sqrt{I_{ref}\cdot I_{obj}}\cdot\cos(\alpha_{diff}+\alpha_{disp}) \quad (1)$$

where I is the total light intensity on the detector element
  $I_{ref}$ is the reference light intensity
  $I_{obj}$ is the object light intensity
  $\mu$ is a factor between 0 and 1, and depends on the coherence of the light etc.
  $\alpha_{diff}$ is the initial optical phase difference between the object- and reference light
  $\alpha_{displ}$ is the additional optical phase difference due to object displacements Equation (1) can also be written as $$I=I_{back}+I_{mod}\cdot\cos(\alpha_{diff}+\alpha_{disp}) \quad (2)$$

where $I_{back}$ is the background level
  $I_{mod}$ is the modulation level

When we have a movement with a velocity $V_{tot}$, as shown in FIG. 1, the phase $\alpha_{displ}$ for a given detector element will be running with a phase velocity $\omega$, depending on the angle between the sensitivity direction line SDL for this detector element and the direction of the velocity $V_{tot}$. If this angle is equal to, or very close to 90 degrees for a particular detector element, then the phase $\alpha_{displ}$ for this detector element will not be running, or it will change very little or very slowly. For other detector elements with other sensitivity directions, the phase $\alpha_{displ}$ will be running, and $\alpha_{displ}$ will be running faster as the SDL line deviates more and more from 90 degrees to the direction of the velocity $V_{tot}$.

As seen from equation (2), the intensity I at a detector will be modulated sinusoidally when the phase $\alpha_{displ}$ is running with time. This means that detectors with sensitivity directions (SDL) 90 degrees or close to 90 degrees to the direction of the velocity $V_{tot}$, will have intensities which are modulated slowly compared to detectors with other sensitivity directions. In the following we call the detectors with sensitivity direction SDL 90 degrees to the velocity $V_{tot}$, for zero detectors. Normally, the zero detector(s) change position all the time, so that different detectors along the line of detectors or within the detector array will be identified as zero detectors as time runs.

The main principle of this invention is to detect and locate zero detectors, that is, to locate detector positions with relatively slow variations in intensity I. This can, for example, be done in one of the following 3 enumerated ways:

1. By sampling the detectors or detector arrays with fast sampling frequencies, and calculating the difference in signal from previous samples. If we call the electrical or digital signal from the detector S, we will have that $$S(t)=K\cdot I(t) \quad (3)$$

where S is signal from detector (electric or digital)
  K is a constant
  t is time
  I is intensity on the detector
  Now, referring to the temporal frequency of the signal S, it can be found that the detector(s) with the lowest frequency of S represent(s) the zero detector(s).

Figure 2:
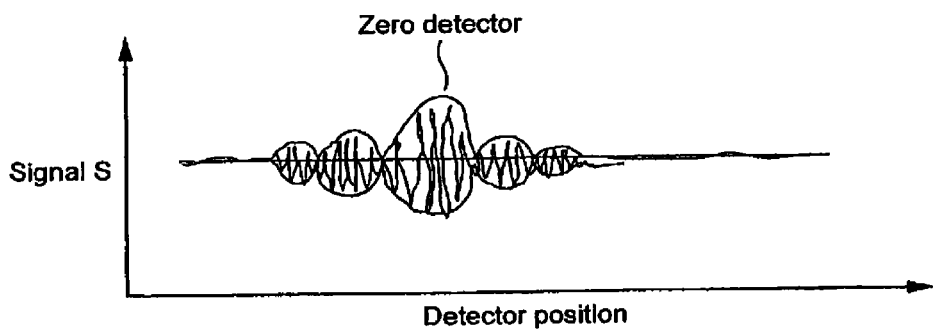
FIG. 2 is a graphical depiction of one way the received signals may appear along a line of detectors.

2. By using detectors with relatively slow sampling frequency and relatively long exposure period per sample. This way, detectors with an intensity fluctuation faster than the detector can resolve in time, will give no, or relatively low fluctuation of the signal S (low amplitude), since the intensity fluctuations will be averaged away. In other words, the signal S can not follow the fast modulation of the intensity I. FIG. 2 shows an example on how the signal may look along a line of detectors. The frequency of the signal S increases by increasing distance from the zero detector at the same time as the signal S decrease in amplitude in accordance to a sine function as shown in FIG. 2. Equation (3) is not valid for this method, except for detector elements close to the zero detector, as the intensity fluctuation for these detectors will be slow enough for the detectors to resolve. The zero detector can be identified and located both by a spatial filtering along the line of detectors (see FIG. 2), and by analysis of the temporal fluctuations.

3. By a method which combines the above mentioned methods, where both the temporal frequency of the detectors are analysed as well as the signal amplitudes.

Figure 3:
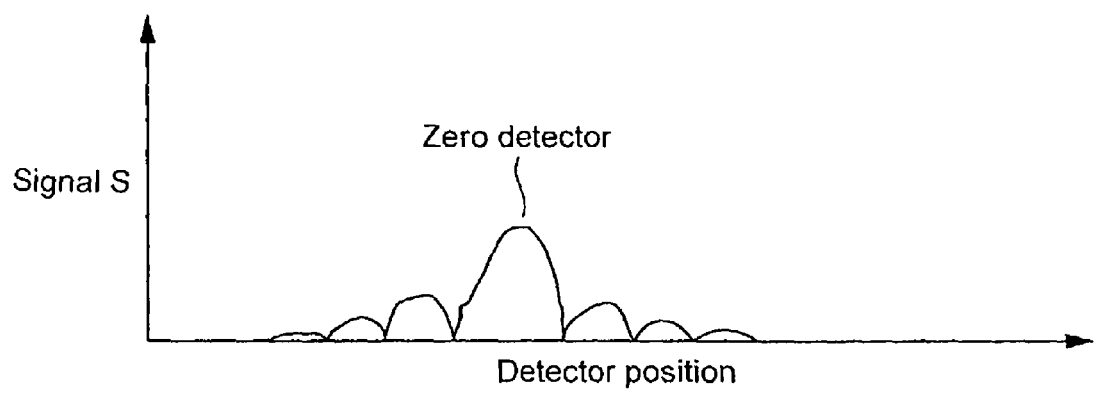
FIG. 3 is a modified form of the curve shown in FIG. 2.

The object light reflected from the OUI will generally have a speckle nature because of the surface roughness of the OUI and the high coherence properties of the laser light. This is also seen in the curve in FIG. 2. When the interferometer is moving relatively to the OUI or vice versa, the speckles will generally decorrelate in space as a result of the movement, and both $I_{obj}$ and $\alpha_{diff}$ in equation (3) will be changing with time. These random changes will give intensity fluctuations as seen from the equation, but these random intensity fluctuations will normally be more slow than the intensity changes due to the relative object movement $V_{tot}$, at least for detectors away from the zero detectors. The random fluctuations mentioned above may be used to obtain averaging effects, leading to a more smooth intensity curve, see FIG. 3, where we have also filtered and rectified the signal. The averaging effects can be obtained both by averaging signals from several neighbouring detector elements or detector arrays, or the averaging can be obtained by averaging in the time domain. The averaging or smoothing effect may make it more easy to detect and locate the exact position of the zero detectors. If the curve in FIG. 3 is sampled at several or many points along the detector line, an algorithm to calculate the "center of gravity" (=zero detector) can be used. The speed of the decorrelation of $I_{obj}$ and $\alpha_{diff}$ if is dependent on the shape, size and focus of the laser beam (ref. former patent).

Figure 4:
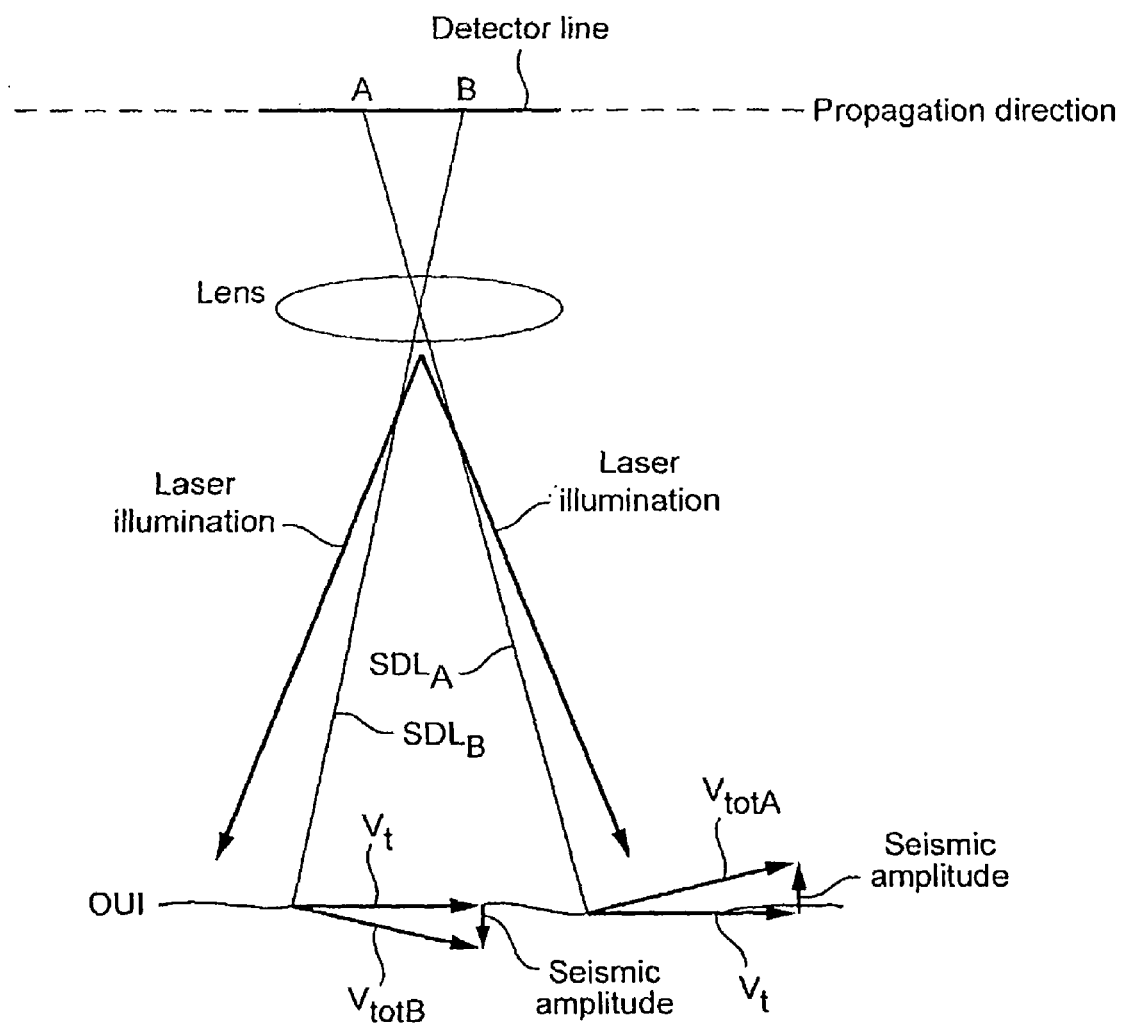
FIG. 4 is a view similar to FIG. 1, showing the invention applied to the detection of seismic signals at the sea floor.

FIG. 4 shows schematically how the invention works for the detection of seismic signals at the sea floor. The interferometer is moving along the dotted line, and the total (relative) velocity of the measurement point which is moving across the sea floor is varying between vector $V_{totA}$ and vector $V_{totB}$ in the figure as long as we have a single frequency, steady state seismic signal with amplitude as indicated in the figure. The zero detector will go between position A and B on the line of detectors. If the transversal velocity $V_t$ is 1 m/s and the seismic amplitude is 100 nanometer at 50 Hz, then the longitudinal velocity amplitude will be 31.4 micrometer/s, and the direction of the total velocity $V_{tot}$ will vary with +/−0.0018 degrees. With the interferometer located 5 meters above the sea floor and with a length of the laser line on the OUI of 0.3 meter, and a detector array length of 50 mm, then the distance between the position A and B on the line of detectors will be approximately 26 micrometer, which is typically 4 pixel distances with a 7 micrometer pixel size.

An example on a recording algorithm for the detection of the zero detector may be as follows:
1. The signal $S_i(t)$ is acquired from all the detector elements i along the line of detectors with a given sampling frequency (t=time);
2. The variation of $S_i(t)$ with time $\partial S_i(t)/\partial t$ is calculated for all pixels;
3. $\partial S_i(t)/\partial t$ is summarized and averaged over some time for all pixels, and may be also averaged over several neighbouring pixels. Some of these neighbouring pixels may also be located in the transversal direction, as indicated in figure x; and
4. A spatial filtering is performed along the line of detectors, to find the position of the zero detector(s).

Other algorithms can also be used, where the time evaluation of the signal S along the line of detectors is being used to locate the zero detector(s).

The invention can also use 1-dimensional "position sensitive detectors" to resolve small variations of intensity movements (small movements of the zero detectors). A position sensitive detector can be based on coupling or correlation techniques between several neighbouring detector elements, and the sensitivity can be increased this way.

To image a 30 cm laser line on the object onto a 50 mm detector line at a 5 meter distance, a focal length of approximately 0.7 meter can be used. The optical distance between the lens and the detector line will be relatively large, but mirrors or other optical elements can be used to obtain a folded light path with smaller overall dimensions, see FIG. 5.

The sensitivity of the system can also be increased or decreased by using different lenses or lens systems or other imaging elements in front of the detectors. Curved mirrors can also be used. We can also have combined systems with 2 or more lines of detectors side by side, where one system can have different lens systems in front of the detectors, while the other lines of detectors have a different lens or imaging system. This way, one detector system can have a high sensitivity, while the other system has lower sensitivity but larger dynamics range with respect to seismic amplitudes and with respect to misalignment of the whole interferometer and laser beam direction compared to the velocity direction $V_{tot}$. In a practical design, the lenses or imaging elements may be long in one direction and narrow in the other transversal direction.

Figure 5:
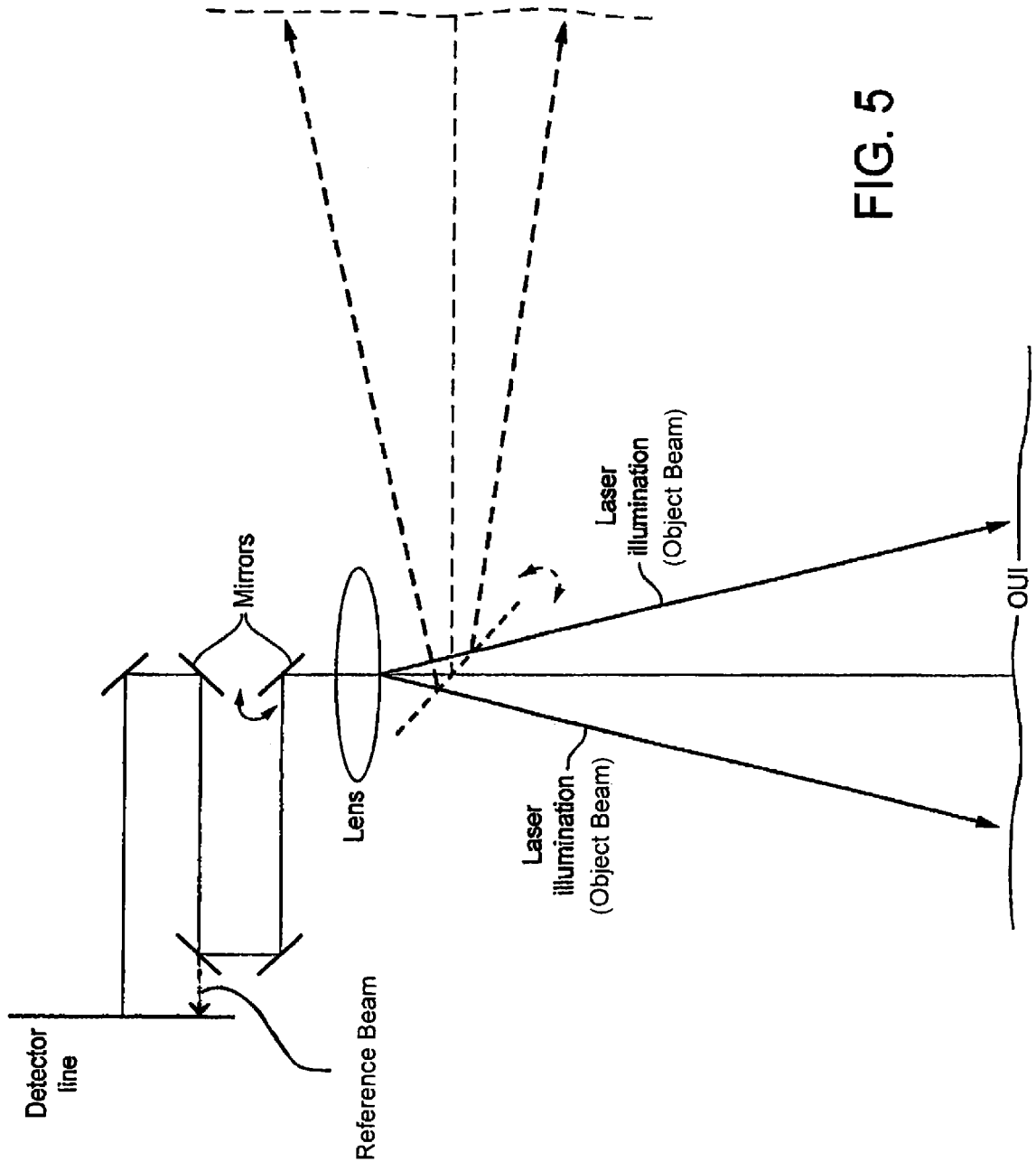
FIG. 5 shows the use of optical elements to modify the system.

If mirrors are mounted between the imaging system and the detectors, or on the outside of the imaging system, then the sensitivity direction lines for the detector elements will be adjusted by tilting one or more of these mirrors as indicated in FIG. 5. If the interferometer is moving with an angular position which vary with time, then it may be required to adjust the sensitivity directions accordingly.

The line of detectors or detector arrays or position sensitive detectors can be short or long. The line may be from a few micrometers to several meters if several laser beams and imaging systems are (preferably) being used.

If two or several parallel detector lines with different sensitivity are used, the least sensitive detector line system (with highest dynamic range) can be used to adjust the sensitivity direction for other detector lines with higher sensitivity, so they can find their respective zero detectors and operate within its limited dynamic range.

The invention can also use a dynamic steering of the sensitivity directions by using a dynamic steering of the mirrors mentioned earlier. The steering of the mirrors is controlled by feedback signals from one or more parallel lines of detectors as described above, so that the zero detector position is kept more or less constant at the detector line, in one or more of the detector lines being used. This way, the steering feedback signal will give information on the seismic signal.

The measurement of seismic signals may have a duration of several seconds, starting with relatively high seismic amplitudes and then with decreasing amplitudes. The dynamic range and the sensitivity of this invention may be adjusted and changed during the measurement period. This can be done by using two or more parallel lines of detectors, or by changing or adjusting optical elements in front of a line of detectors.

Figure 6:
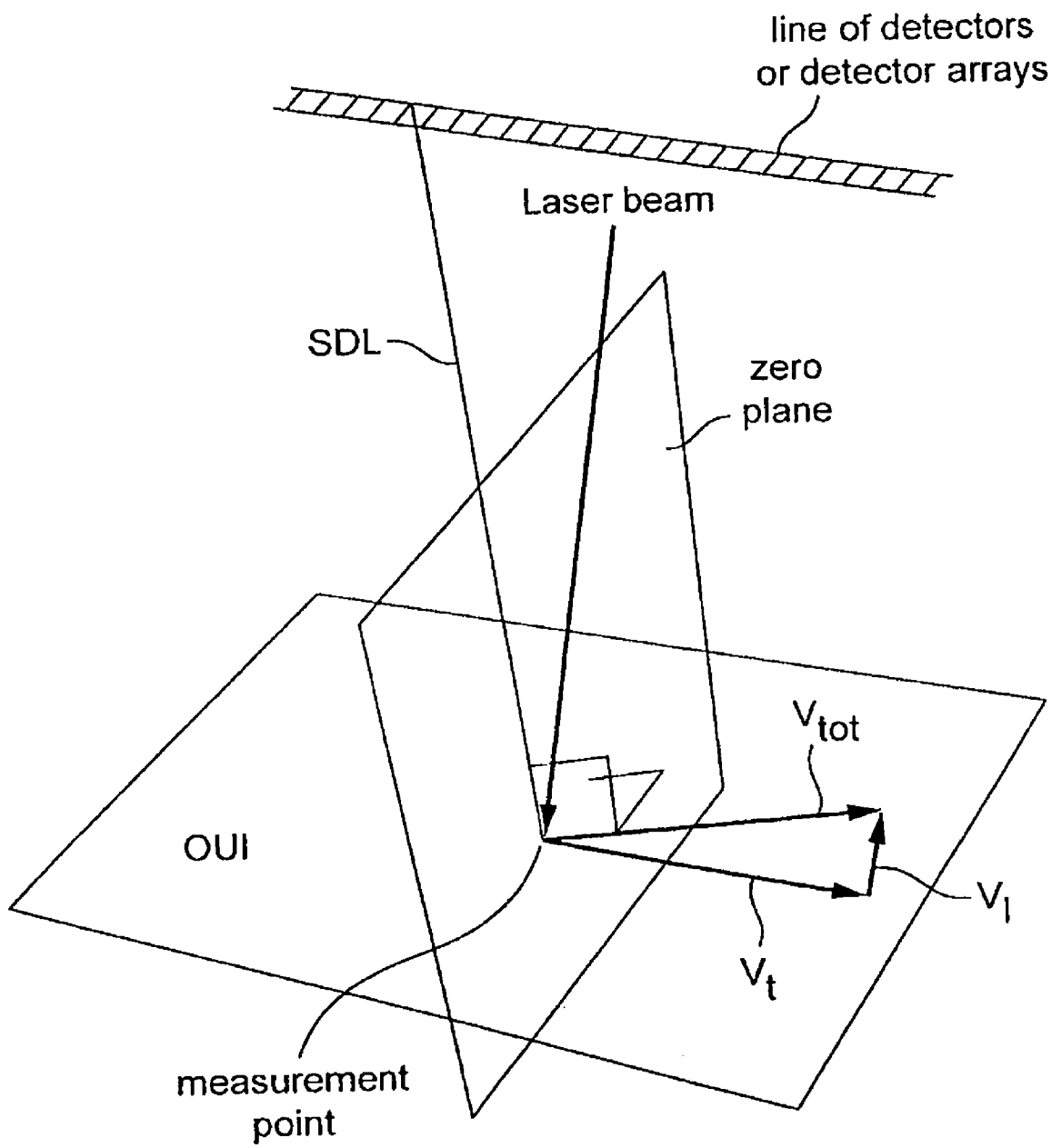
FIG. 6 shows an alternative embodiment.

Another design of the invention is shown in FIG. 6.

In this case, a laser beam is directed toward the object under investigation (OUI) to illuminate a single point on the surface (measurement point in FIG. 6). The laser beam can be converging or diverging with its focus at different distances from the source, including points below or beyond the OUI. The beam can also have different shapes (circular, rectangular etc.) and the beam can also be focused towards a line below the surface instead of a point.

A line of detector elements is arranged basically in the same direction as the transversal velocity component $V_t$, as shown in FIG. 6. As before, each detector element can be replaced with a detector array. The detector elements or detector arrays are also illuminated by one or more reference beams, which are at least partly coherent with the object light reflected from the OUI (the reference beams are not shown in FIG. 6). The light reflected from the measurement point on the OUI can also be reflected by mirrors or guided by other elements or by other means, so that the line of detectors or detector arrays can be physically located and geometrically arranged in other ways than shown in FIG. 6.

In FIG. 6, the zero plane is shown. This is the plane in space which goes through the measurement point and which is normal to the velocity vector $V_{tot}$. As before, each detector element, located at a specific location along the line of detectors, has its own specific sensitivity direction. The line SDL in FIG. 6 represents a line or direction like this.

Figure 7:
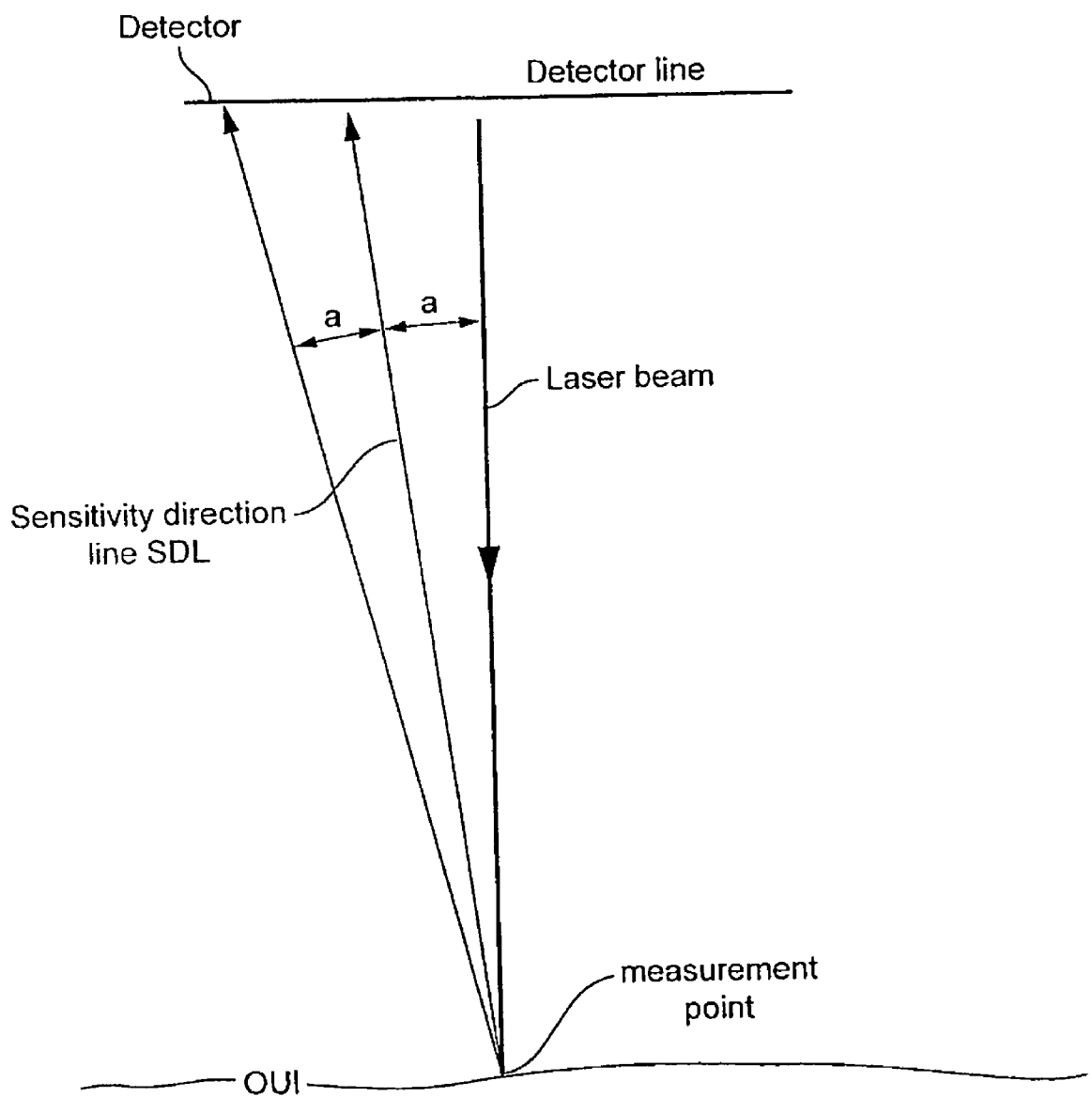
FIG. 7 shows more specifically the sensitivity line for a detector.

The interferometer and the laser beam are located and arranged with angular directions so that at least one detector or detector array on the detector line has a sensitivity direction line SDL which is parallel to and actually located in the zero plane. With the arrangement shown in FIG. 6, the sensitivity direction for a detector element is not the line which goes from the measurement point (laser spot on OUI) and toward the detector element. The sensitivity direction for a detector element is shown in FIG. 7.

A detector element with a sensitivity line SDL in the zero plane will have no sensitivity to the velocity $V_{tot}$, but all other detector elements with other sensitivity directions will pick up a smaller or larger part of the velocity $V_{tot}$. The equation for the light intensity is the same for this optical configuration as for the former configuration, so equations (1) and (2) are still valid.

Figure 8:
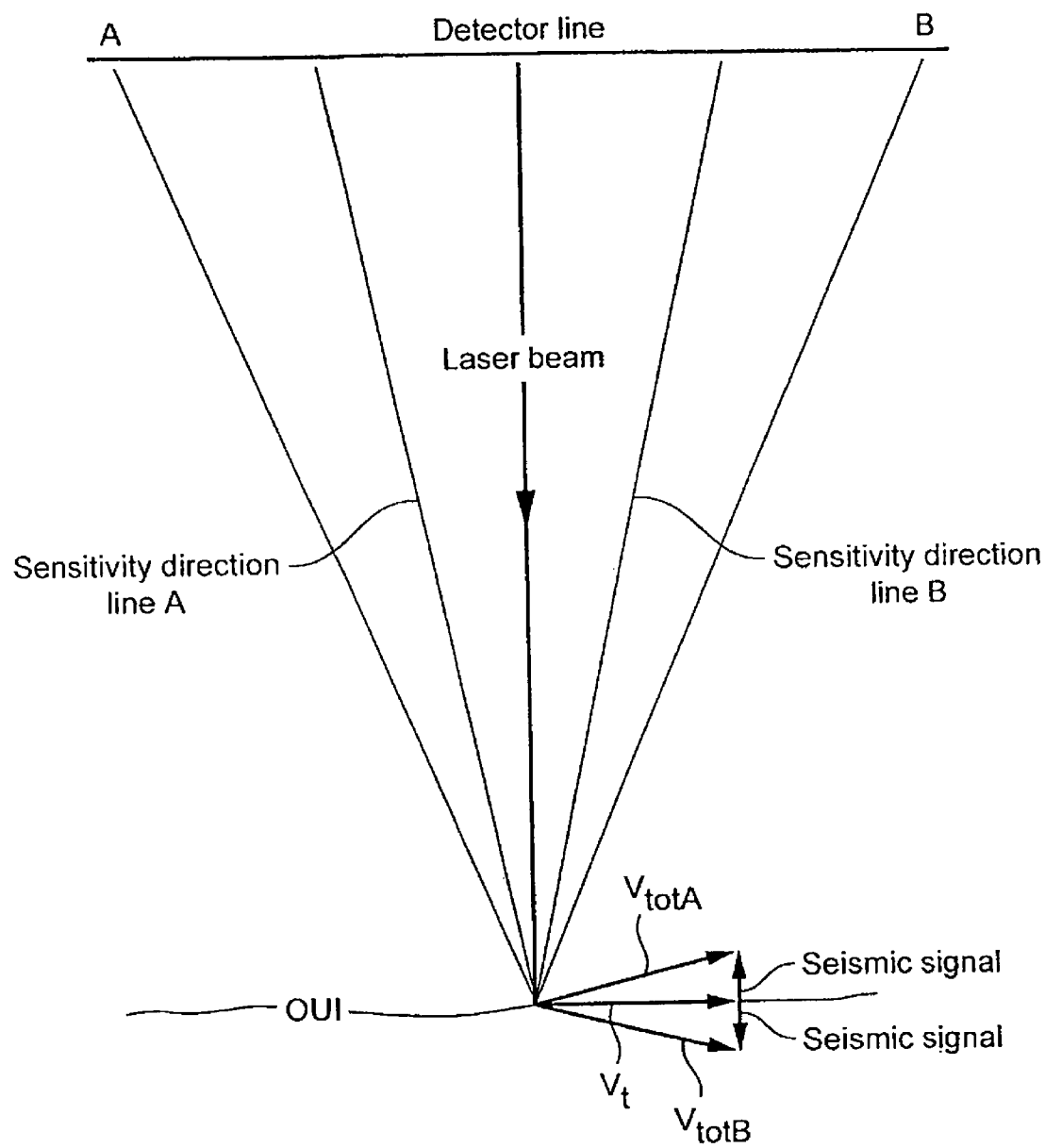
FIG. 8 shows more specifically the detection of seismic signals at the sea floor.

FIG. 8 shows schematically how the invention works for the detection of seismic signals at the sea floor. The total (relative) velocity of the measurement point which is moving across the sea floor is varying between vector $V_{totA}$ and vector $V_{totB}$ in the figure as long as we have a single frequency steady state seismic signal with amplitude as indicated in the figure. The zero detector will go between position A and B on the line of detectors. If the transversal velocity $V_t$ is 1 m/s and the seismic amplitude is 100 nanometer at 50 Hz, then the longitudinal velocity amplitude will be 31.4 micrometer/s, and the direction of the total velocity $V_{tot}$ will vary with +/−0.0018 degrees. If the interferometer is located 5 meters above the sea floor, the distance between the position A and B on the line of detectors will be 314 micrometer, which is typically 40 pixel distances with a 7 micrometer pixel size.

Also with this optical configuration, "position sensitive detectors" can be used to resolve small variations of intensity movements (small movements of the zero detectors). The main difference between this configuration and the first configuration, is that no imaging optics are used, and that the line of detector elements will normally be longer.

Figure 9:
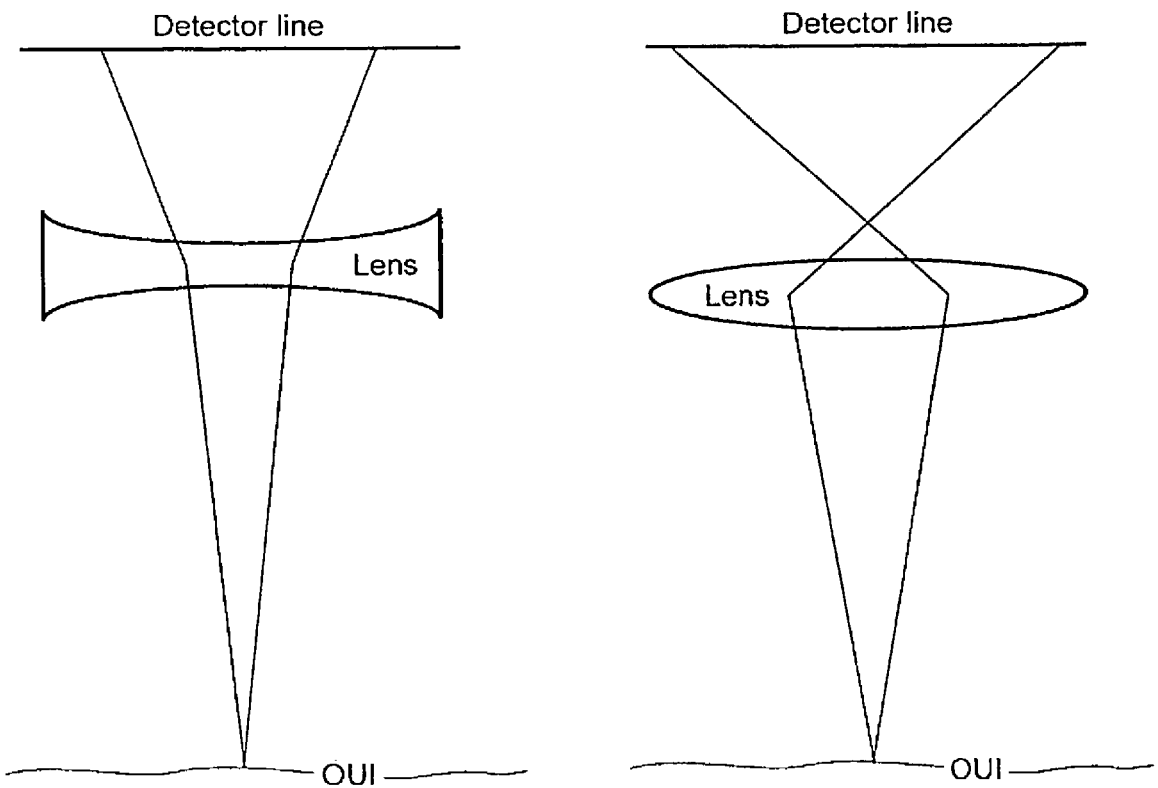
FIG. 9 shows two alternative lens configurations for use in the invention.

However, the sensitivity of this second configuration can also be increased or decreased by using negative or positive lenses or lens systems or other imaging elements in front of the detectors, as shown in FIG. 9. Curved mirrors can also be used. Also in this case, combined systems with 2 or more lines of detectors side by side can be used, where one system can have different lens systems (or no lenses) in front of the detectors, while the other lines of detectors have a different lens or imaging system.

As before, the line of detectors or detector arrays or position sensitive detectors can be short or long; it may be from a few micrometers to several meters or even continuous along distances of several hundred meters, if several laser beams are (preferably) being used. If the length of the detector line is limited, the zero detector position may end up outside the line of detector arrays, so no detector element along the line becomes the zero detector. In this case, the direction of the laser beam can be adjusted until the zero detector position is brought within the range (length) of the line of detector elements. In addition, if the light coming towards the line of detectors is reflected via mirrors before it reaches the detectors, these mirrors can be tilted to obtain a proper sensitivity direction for the system.

With this second configuration, a dynamic steering of the laser beam is possible, where the steering of the beam is controlled by feedback signals from one or more parallel lines of detectors as described above, so that the zero detector position is kept more or less constant at the detector line, in one or more of the detector lines being used. As before, the steering feedback signal will give information on the seismic signal. The laser beam is preferably being controlled in one direction only, basically in the same direction as the velocity $V_{tot}$ which again, is normally the same direction, or nearly the same direction as the line of detectors.

Generally, unlike the system described earlier with reference to FIG. 1, the system in FIG. 6 will have higher sensitivity but smaller dynamic range with increasing distance to the OUI. The distance to the OUI can be found by the system using the data S from the line of detectors, as the zero detector area will be wider with increasing distance.

A disadvantage with the second configuration compared to the first one is that changes in the distance between the interferometer and the OUI may give false signals along the detector line. These false signals may be small, but if the system is arranged to resolve very small amplitudes, this error source may be a limiting factor.

Phase Modulation

Figure 10:
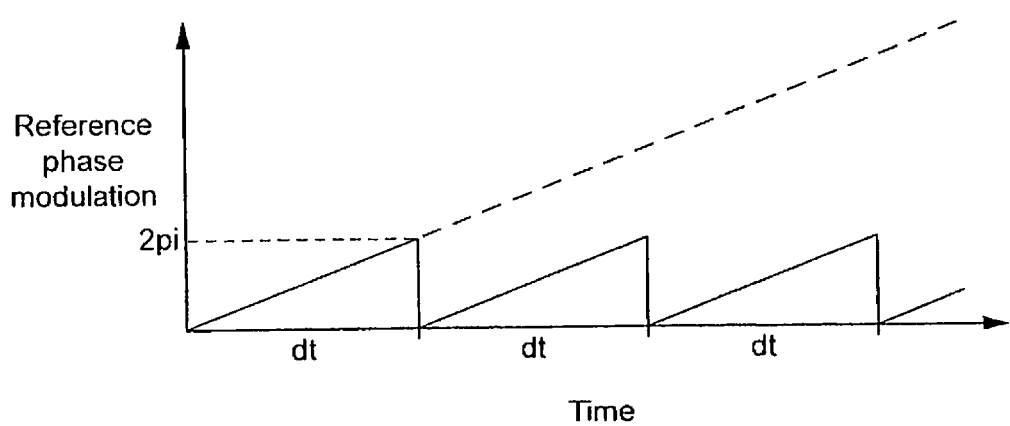
FIG. 10 shows the use of phase modulation of the reference beam to compensate for movement of the interferometer.

If the laser beam and the sensitivity directions of the system (both the first and the second configuration) pick up a large part of the movement of the interferometer or the OUI, then phase modulation of the reference beam can be used to compensate for this, see FIG. 10. This is described in UK Patent Application No. 0402914.6, mentioned above.

"DC light" refers to light which has a more constant light intensity in relation AC light over a typical window of time. If a relatively large part of the movement of the interferometer is picked up by the system, this means that the velocity $V_l$ gets large, so that $V_l$ may have a large constant DC component with a small AC component on top of it. The large DC component of $V_l$ can be removed by using phase modulation of the reference beam. Phase modulation actually means that we move the curve in FIG. 3 sideways (left or right) on the detector line. Another way to express this, is by saying that the ankle between the zero line or zero plane and the total velocity $V_{tot}$ becomes different from 90 degrees when phase modulation of the reference is used.

If, for instance, the laser beam is directed with an angle forward or backward relative to the propagation direction for the interferometer (with reference to FIG. 4 and FIG. 8), then the velocity $V_l$ will get a smaller or larger DC level. In this case, phase modulation can be used to compensate for this.

Using phase modulation, a "synthetic" longitudinal velocity can be put on the system. If a sinusoidally varying velocity $V_l$ with given amplitude and frequency is simulated, and if the corresponding zero detector "amplitude" along the detector line at this same frequency is found, then the transversal velocity $V_t$ can be calculated from these data.

3-Dimensional Measurement

Figure 11:
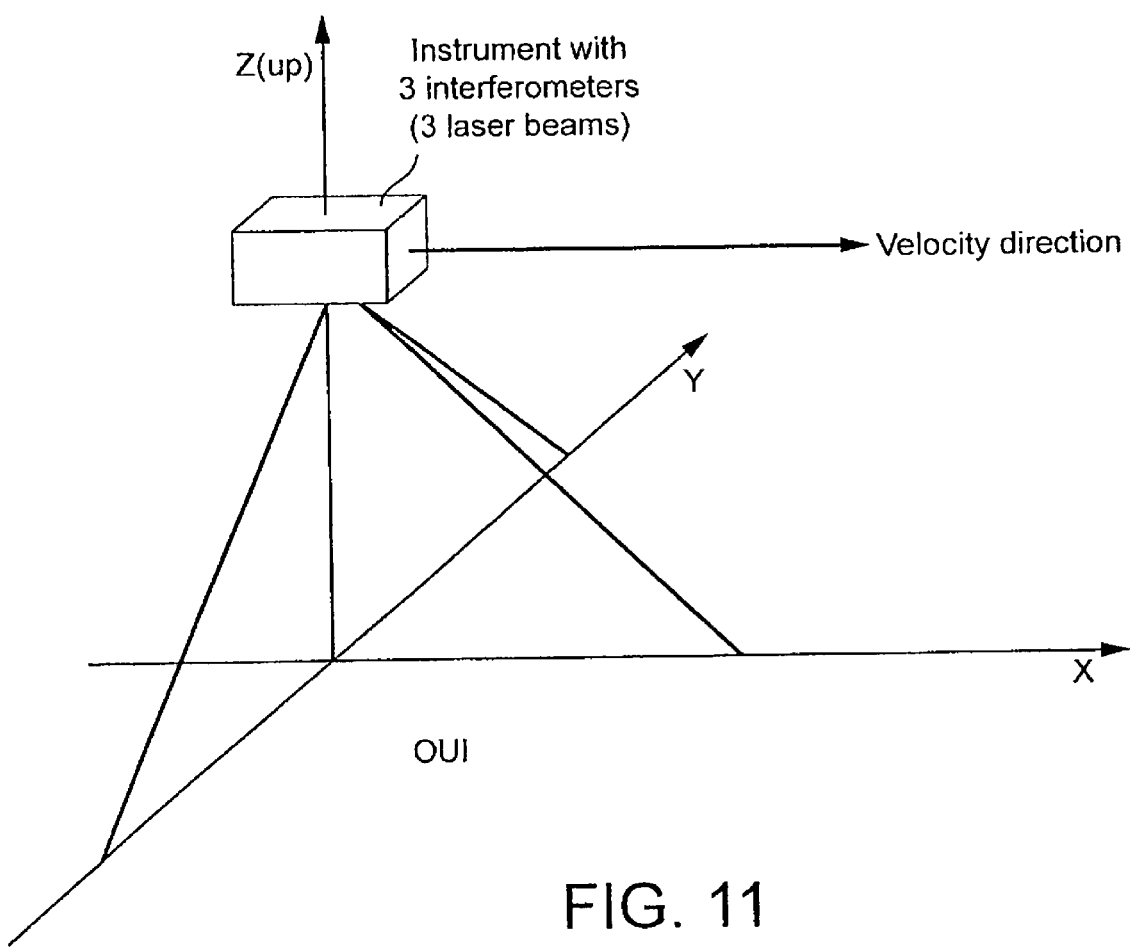
FIG. 11 shows the application of the invention to 3-dimensional measurement.

The invention can be used to measure spatial 3-dimensional displacements if for example three separate units like the ones in FIG. 1 and/or in FIG. 6 are being used. FIG. 11 shows an example of this, where the seismic signals in the sea floor are measured in 3 dimensions. Each of the laser beams in the figure can be a laser beam or a laser line as described earlier. With the arrangement shown in FIG. 11, phase modulation would be required in the unit pointing forward in the velocity directions.

It is assumed that the wavelength of the OUI oscillations (waves) are larger than the distance between the positions on the OUI where the sensitivity lines in the laser beam impinge.

If there are a large number of systems as shown in FIG. 11, moving in a large array of systems, measurements over larger areas of the sea floor can be carried out. Combined systems can also be used, where light reflected from the same illumination line or illumination point can be picked up by different neighborring detector systems, to obtain measurements with different sensitivity directions.

The invention claimed is:

1. A method of measuring a surface using an interferometer, in which there is relative motion between the surface and the interferometer, the motion having a total velocity $V_{tot}$ which includes a transversal or traversing component $V_t$ and a longitudinal component $V_l$, and a transversing component in a transversal direction relative to the longitudinal component $V_l$, the method comprising:
   directing an object beam of coherent light to a measurement position at the surface, whereby there is relative motion between the surface and the measurement position;
   arranging an array of detectors on the interferometer in a line extending generally in the transversal direction, the detectors being arranged to detect light rays with different angular directions, representing different sensitivity directions;
   producing a reference beam of coherent light which is at least partly coherent with the object beam;
   combining the reference beam with the reflected object beam from the surface to produce a cross interference in the speckle pattern providing information about the relative motion of the surface and the interferometer;
   detecting the speckle pattern and the cross interference pattern with the detectors;
   determining which detector in the array has zero or minimum sensitivity to the total velocity $V_{tot}$ of the motion; thereby identifying the detector associated with a sensitivity direction that is normal to $V_{tot}$ while other detectors are associated with other sensitivity directions and sense a smaller or larger part of the total velocity $V_{tot}$;
   monitoring a temporal change in the detector which has zero or minimum sensitivity to the total velocity, thereby ascertaining the change in direction of $V_{tot}$ over time, brought about by changes in $V_l$; and
   determining temporal changes in $V_l$.

2. The method of claim 1, wherein the object beam and the reference beam emanate from the interferometer.

3. The method of claim 1, wherein the interferometer is moving constantly in the transversal direction and the surface is moving intermittently, relatively, in a direction other than the transversal direction.

4. The method of claim 1, wherein the coherent light beams are laser beams.

5. The method of claim 4, wherein the object beam is expanded to illuminate the object under investigation.

6. The method of claim 1, wherein the measurement position is a point or a line on the surface of the object under investigation.

7. The method of claim 1, wherein each detector in the array consists of a line of detectors extending generally parallel to or generally at right angles to the transversal direction.

8. The method of claim 1, wherein the detectors take the form of a full-field detector array.

9. The method of claim 1, wherein the light beams are subjected to imaging by imaging optics immediately prior to being detected by the detectors.

10. The method of claim 9, wherein the imaging optics comprise a lens system or curved mirrors.

11. A system for studying a surface in relative motion, the motion having a total velocity $V_{tot}$ which includes a longitudinal component $V_l$ and a transversing component in a traversal direction relative to the longitudinal component $V_l$, the system comprising:
   an interferometer in relative motion with the surface, the interferometer including:
   an object beam source of coherent light arranged to direct the object beam to a measurement position on the surface;
   an array of detectors on the interferometer in a line extending generally in the transversal direction, the detectors being arranged to detect light rays with different angular directions, representing different sensitivity directions; and
   a reference beam source of coherent light arranged to produce a reference beam which is at least partially coherent with an object beam, the reference beam source being arranged to combine the reference beam with the reflected object beam from the surface to produce a cross interference in the speckle pattern providing information about the relative motion of the surface and the interferometer, the detectors being arranged to detect the speckle pattern and the cross interference pattern; and a computer configured to:
   determine which detector in the array has zero or minimum sensitivity to the total velocity $V_{tot}$ of the motion, thereby enabling the detector associated with a sensitivity direction that is normal to $V_{tot}$ while other detectors are associated with other sensitivity directions and sense a smaller or larger part of the total velocity $V_{tot}$;
   monitor a temporal change in the detector which has zero or minimum sensitivity to the total velocity whereby the change in direction of $V_{tot}$ over time brought about by changes in $V_l$ can be ascertained; and
   determine temporal changes in $V_l$.

12. The system of claim 11, wherein each detector element comprises a line of individual detectors.

13. The system of claim 12, wherein the line is in parallel with or transverse to the tranversal detector line and the detectors include a full-field detector array.

14. The system of claim 11, wherein the interferometer further includes imaging optics in front of the line of detectors.

15. The system of claim 14, wherein the imaging optics include an imaging lens, a lens system or curved mirrors.

16. A method of investigating a sea floor by using an interferometer, in which there is relative motion between the sea floor and the interferometer, the motion having a total velocity $V_{tot}$ which includes a transversal or traversing component $V_t$ and a longitudinal component $V_l$, and a transversing component in a transversal direction relative to the longitudinal component $V_l$, the method comprising:
   directing an object beam of coherent light to a measurement position at the sea floor, whereby there is relative motion between the sea floor and the measurement position;
   arranging an array of detectors on the interferometer in a line extending generally in the transversal direction, the detectors being arranged to detect light rays with different angular directions, representing different sensitivity directions;

producing a reference beam of coherent light which is at least partly coherent with the object beam;

combining the reference beam with the reflected object beam from the sea floor to produce a cross interference in the speckle pattern providing information about the relative motion of the sea floor and the interferometer;

detecting the speckle pattern and the cross interference pattern with the detectors;

determining which detector in the array has zero or minimum sensitivity to the total velocity $V_{tot}$ of the motion; thereby identifying the detector associated with a sensitivity direction that is normal to $V_{tot}$ while other detectors are associated with other sensitivity directions and sense a smaller or larger part of the total velocity $V_{tot}$;

monitoring a temporal change in the detector which has zero or minimum sensitivity to the total velocity, thereby ascertaining the change in direction of $V_{tot}$ over time, brought about by changes in $V_l$; and determining temporal changes in $V_l$.

17. A method of measuring a rotating machine part by using an interferometer, in which there is relative motion between the rotating machine part and the interferometer, the motion having a total velocity $V_{tot}$ which includes a transversal or traversing component $V_t$ and a longitudinal component $V_l$, and a transversing component in a transversal direction relative to the longitudinal component $V_l$, the method comprising:

directing an object beam of coherent light to a measurement position at the rotating machine part, whereby there is relative motion between the rotating machine part and the measurement position;

arranging an array of detectors on the interferometer in a line extending generally in the transversal direction, the detectors being arranged to detect light rays with different angular directions, representing different sensitivity directions;

producing a reference beam of coherent light which is at least partly coherent with the object beam;

combining the reference beam with the reflected object beam from the rotating machine part to produce a cross interference in the speckle pattern providing information about the relative motion of the rotating machine part and the interferometer;

detecting the speckle pattern and the cross interference pattern with the detectors;

determining which detector in the array has zero or minimum sensitivity to the total velocity $V_{tot}$ of the motion; thereby identifying the detector associated with a sensitivity direction that is normal to $V_{tot}$ while other detectors are associated with other sensitivity directions and sense a smaller or larger part of the total velocity $V_{tot}$;

monitoring a temporal change the detector which has zero or minimum sensitivity to the total velocity, thereby ascertaining the change in direction of $V_{tot}$ over time, brought about by changes in $V_l$; and determining temporal changes in $V_l$.

\* \* \* \* \*

UNITED STATES PATENT AND TRADEMARK OFFICE
CERTIFICATE OF CORRECTION

PATENT NO.           : 7,933,003 B2                                      Page 1 of 1
APPLICATION NO.      : 11/659383
DATED                : April 26, 2011
INVENTOR(S)          : Meldahl et al.

It is certified that error appears in the above-identified patent and that said Letters Patent is hereby corrected as shown below:

In the Claims

Column 9, line 18, Claim 1, after "which includes", please delete "a transversal or traversing component $V_1$ and".

Column 9, line 19, Claim 1, after "component $V_1$", please delete ",".

Column 10, line 55-56, Claim 16, after "which includes", please delete "a transversal or traversing component $V_1$ and".

Column 10, line 56, Claim 16, after "component $V_1$", please delete ",".

Column 11, lines 23-24, Claim 17, after "which includes", please delete "a transversal or traversing component $V_1$ and".

Column 11, line 25, Claim 17, after "component $V_1$", please delete ",".

Signed and Sealed this
Eighteenth Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 7,933,003 B2  Page 1 of 1
APPLICATION NO. : 11/659383
DATED : April 26, 2011
INVENTOR(S) : Meldahl et al.

It is certified that error appears in the above-identified patent and that said Letters Patent is hereby corrected as shown below:

In the Claims

Column 9, line 18, Claim 1, after "which includes", please delete "a transversal or traversing component $V_t$ and".

Column 9, line 19, Claim 1, after "component $V_1$", please delete ",".

Column 10, line 55-56, Claim 16, after "which includes", please delete "a transversal or traversing component $V_t$ and".

Column 10, line 56, Claim 16, after "component $V_1$", please delete ",".

Column 11, lines 23-24, Claim 17, after "which includes", please delete "a transversal or traversing component $V_t$ and".

Column 11, line 25, Claim 17, after "component $V_1$", please delete ",".

This certificate supersedes the Certificate of Correction issued March 18, 2014.

Signed and Sealed this
Fifth Day of August, 2014

Michelle K. Lee
*Deputy Director of the United States Patent and Trademark Office*